United States Patent
Bakalski et al.

(10) Patent No.: US 9,641,201 B2
(45) Date of Patent: May 2, 2017

(54) SYSTEM AND METHOD FOR A RADIO FREQUENCY INTEGRATED CIRCUIT

(71) Applicant: Infineon Technologies AG, Neubiberg (DE)

(72) Inventors: Winfried Bakalski, Munich (DE); Werner Simbuerger, Haar (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/264,986

(22) Filed: Apr. 29, 2014

(65) Prior Publication Data

US 2015/0311922 A1   Oct. 29, 2015

(51) Int. Cl.
| | | |
|---|---|---|
| *H03H 7/48* | (2006.01) | |
| *H04B 1/00* | (2006.01) | |
| *H04B 1/04* | (2006.01) | |
| *H04B 1/18* | (2006.01) | |
| *H04W 88/06* | (2009.01) | |

(52) U.S. Cl.
CPC .......... *H04B 1/006* (2013.01); *H04B 1/0458* (2013.01); *H04B 1/18* (2013.01); *H04W 88/06* (2013.01)

(58) Field of Classification Search
CPC ........ H04B 1/006; H04B 1/0458; H04B 1/18; H04W 88/06
USPC ........................................ 333/132, 258, 262
See application file for complete search history.

(56) References Cited

U.S. PATENT DOCUMENTS

| | | | |
|---|---|---|---|
| 5,440,306 A * | 8/1995 | Tatsumi | H03H 19/004 341/150 |
| 2007/0105506 A1 | 5/2007 | Kemmochi et al. | |
| 2011/0105055 A1 | 5/2011 | Ilkov | |
| 2011/0260806 A1 | 10/2011 | Takeuchi | |
| 2012/0094623 A1* | 4/2012 | Khlat | H04B 1/18 455/150.1 |
| 2012/0154017 A1 | 6/2012 | Sugiura et al. | |
| 2014/0009205 A1 | 1/2014 | Madan et al. | |
| 2014/0340181 A1 | 11/2014 | Bakalski | |
| 2015/0109072 A1 | 4/2015 | Bakalski | |
| 2015/0288359 A1 | 10/2015 | Bakalski et al. | |

FOREIGN PATENT DOCUMENTS

| | | |
|---|---|---|
| DE | 112008000067 T5 | 11/2009 |
| JP | 2003174367 A | 6/2003 |
| JP | 5316544 B2 | 10/2013 |
| KR | 1020040075969 A | 8/2004 |
| KR | 20100127827 A | 12/2010 |
| KR | 20140030627 A | 3/2014 |

* cited by examiner

*Primary Examiner* — Robert Pascal
*Assistant Examiner* — Kimberly Glenn
(74) *Attorney, Agent, or Firm* — Slater Matsil, LLP

(57) ABSTRACT

In accordance with an embodiment, a radio frequency integrated circuit (RFIC) includes an adjustable capacitance coupled to an input terminal of the RFIC, and a first single-pole multiple-throw (SPMT) radio frequency (RF) switch having an input coupled to the adjustable capacitance and a plurality of output nodes coupled to a corresponding plurality of second output terminals of the RFIC.

26 Claims, 8 Drawing Sheets

SYSTEM AND METHOD FOR A RADIO FREQUENCY INTEGRATED CIRCUIT

TECHNICAL FIELD

The present disclosure relates generally to an electronic device, and more particularly to a system and method for a radio frequency (RF) integrated circuit.

BACKGROUND

RF switches are used in a variety of RF circuits to implement various functions. For instance, an RF system using different signaling methods over different frequencies may be implemented by using a network of antenna switches to select from between different types of RF front-end circuits. One example of such a circuit is a multi-standard cellular telephone that can make calls using different standards such as code division multiple access (CDMA) or Global System for Mobile Communications (GSM). By using an RF switch, an RF front end circuit optimized for CDMA communication may be used for CDMA calls, while an RF front-end circuit optimized for GSM communication may be used for GSM calls. In addition, RF switches may be used to implement adjustable matching networks for antennas and power amplifiers, and to provide adjusting tuning for high frequency filters by switching in and out and/or bypassing passive matching and tuning elements.

As the number of bands supported by multi-standard cellular handsets increases, there is a corresponding increase in the number of switches, filters, amplifiers and matching networks and supporting routing used to implement the front ends of such handsets. In some cases, these components may be implemented using multichip modules that house several integrated circuits, RF filters, and passive components. Some of the technical challenges involved in the design of such multi-standard systems and multichip modules that support such systems is the routing of connection lines in a way that takes into consideration performance issued caused by cross coupling between connection lines, isolation and attenuation that may degrade RF performance.

SUMMARY OF THE INVENTION

In accordance with an embodiment, a radio frequency integrated circuit (RFIC) includes an adjustable capacitance coupled to an input terminal of the RFIC, and a first single-pole multiple-throw (SPMT) radio frequency (RF) switch having an input coupled to the adjustable capacitance and a plurality of output nodes coupled to a corresponding plurality of second output terminals of the RFIC.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context: a system and method for a radio frequency integrated circuit (RFIC). The invention may also be applied to other systems and applications including other circuits that utilize switches for high frequency applications such as wireless and wireline communication systems, radar systems, and in circuits such as oscillators, receive/transmit switches, attenuators, power amplifier bypass circuits, RF matching and RF filter switching in general.

In embodiments of the present invention, an integrated circuit includes an adjustable series capacitor coupled to a common port of a single-pole multiple throw (SPMT) RF switch. During operation, the capacitance of the adjustable series capacitor is adjusted to provide an RF match to a selected load coupled to the output of the SPMT switch. In some embodiments, multiple RF loads may be coupled to the outputs of the SPMT switch without using additional series capacitors to provide matching to the individual loads, since the adjustable series capacitor provides the requisite series capacitance. In some embodiments, a digital interface and a lookup table may be used to select the position of the SPMT switch and its associated capacitance setting. In some embodiments, the multiple RF loads may include, for example, RF filters antenna ports, and other RF circuits. The setting of the adjustable series capacitor may be selected such that a wide variety of RF mismatches may be compensated. This may include, for example, mismatched characteristic impedances and PCB related mismatches due to asymmetric trace dimensions and parasitics.

Figure 1:
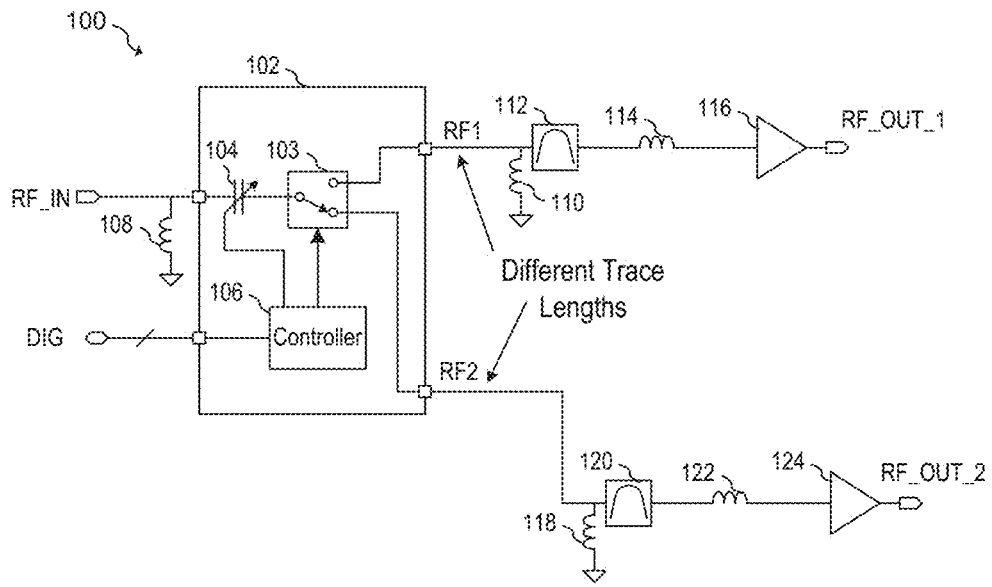
FIG. 1 illustrates an embodiment RF switch system.

FIG. 1 illustrates embodiment RF system 100 that includes switching RFIC 102 that selectively couples terminals RF1 and RF2 to input terminal RF_IN via RF switch 102. In an embodiment, programmable capacitor 104 is adjusted to provide an RF match between terminals RF_IN and RF1 between RF_IN and RF2 depending on the state of RF switch 103. As shown, node RF1 is coupled to filter 112, and node RF2 is coupled to filter 120. Filters 112 and 120 may have different input impedances and/or the length of the routing from the output of RF switch 103 to the input of filter 112 may be different from the length from the output of RF switch 103 in the input of filter 120. In some embodiments, RFIC 102 may be disposed on the same printed circuit board (PCB) as filters 112 and 120. In addition, amplifier 116 may be coupled to the output of filter 112, and amplifier 124 may be coupled to the output of filter 120. Amplifiers 116 and 124 may be implemented, for example, using low noise amplifiers (LNAs) or other RF components. In addition, shunt inductor 108 may be used to match signal RF_IN to the input of RF IC 102, shunt inductor 110 may be used to partially match the output of RF switch 103 with the input of filter 112, and shunt inductor 118 may be used to partially match the output of RF switch 103 to the input of filter 120. In embodiments, these partial matches may be completed with the adjustable series capacitance of programmable capacitor 104. Series inductors 114 and 122 may be used, for example, to match the inputs of amplifiers 116 and 124, respectively. In further embodiments greater or fewer matching components may be used as depicted in FIG. 1. In further alternative embodiments, different matching network topologies may be used. For example, a shunt inductor may be used in place of series inductors 114 and 122 and/or series inductors may be used in place of shunt inductors 108, 110 and 118.

In an embodiment, controller 106 may be used to control the state of RF switch 103 and programmable capacitor 104. The input of controller 106 may be coupled to a digital bus DIG, such that the state of RF switch 103 and programmable capacitor 104 is controllable externally from RFIC 102. In some embodiments, the selection of the value of programmable capacitor 104 may be made to be dependent on the position of RF switch 103. These capacitance values may be programmed, for example, during the manufacture of embodiment RF system 100. For example, a first capacitance value for programmable capacitor 104 that provides a match to filter 112, and a second capacitance value for programmable capacitor 104 that provides a match to filter 120 may be programmed in a memory, such as a nonvolatile memory or mask programmable ROM, or may be stored in a lookup table, such that the programmable capacitance value of 104 is dependent on the selected position of RF switch 103. These capacitance values may be determined, such that unequal trace lengths between RF switch 103 and filters 112 and 120 are taken into account with respect to matching.

Figure 2A:
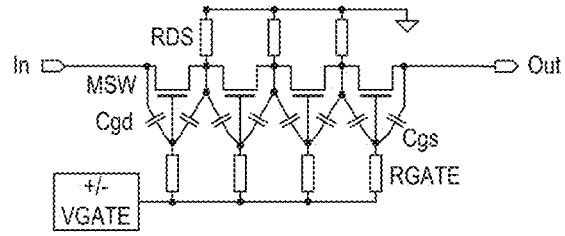
FIGS. 2a-d illustrate various embodiment programmable capacitors.

In an embodiment, programmable capacitor 104 may be implemented using the parasitic capacitances of an RF switch. FIG. 2a illustrates an RF switch that includes MOS transistors MSW having their load paths coupled in series and their gate connections coupled to the gate voltage generator VGATE via series gate resistors RGATE. In the embodiment of FIG. 2a, internal source/drain connections are coupled to ground via resistors RDS. In one example, embodiment resistors RDS may be about 400 kΩ, however, other values may be used. As shown, transistor MSW is implemented using an NMOS device, however, transistor MSW may be implemented using a PMOS device, or other transistor type in a CMOS-Bulk, CMOS-SOI using think or thick film silicon on insulator (SOI), GaAs-HEMTs, or other FET transistor type technology. In some cases, PIN Diodes may also be used.

As shown, MOS transistors MSW have gate-drain capacitances Cgd and gate source capacitances Cgs. When resistances RGATE have an impedance that is sufficiently greater than the capacitive impedances of Cgd and Cgs, these parasitic overlap capacitances are symmetrically spread over all MOS transistors MSW when transistors MSW are shut off. Thus, the capacitance between input node In an output node Out is approximately the series combination of gate drain capacitances Cgd and gate source capacitances Cgs.

Figure 2B:
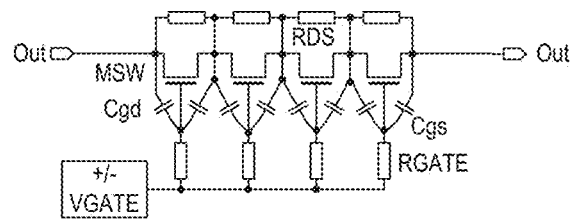

FIG. 2b illustrates an alternative embodiment, RF switch, in which the source/drain connections of MOS transistors MSW are biased using series resistors RDS.

In an embodiment, the stacking of transistors in a common gate configuration is used to switch on and off an RF chain. Assuming that RGATE has a high ohmic value, the overall parasitic OFF-capacitance may be expressed as:

$$C_{off} = \frac{W\ Cgs}{2N} * THROWCOUNT,$$

where W is the transistor width, Cgs the gate/source and gate/drain overlap capacitance, and N is the number of transistors coupled in series. THROWCOUNT is defined as the number of transistors on the embodiment switch. As can be seen by the equation above, the overall parasitic OFF-capacitance $C_{off}$ increases as N is reduced and decreases as N is increased.

Figure 2C:
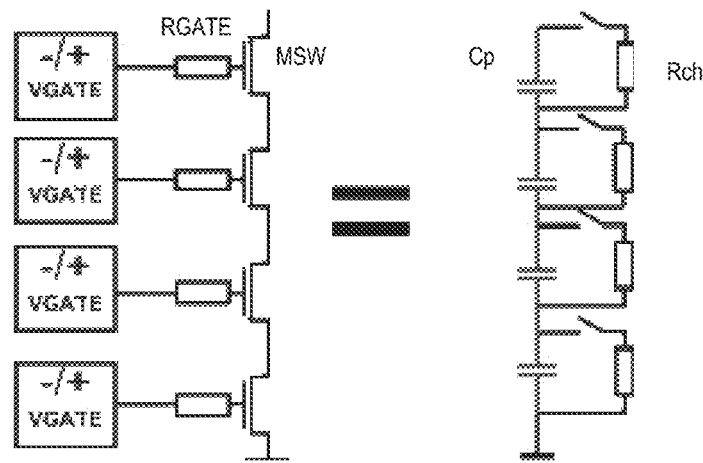

FIG. 2c illustrates an adjustable capacitance according to an embodiment of the present invention. In an embodiment, an RF switch having separately switchable series MOS transistors MSW may be used to implement a programmable capacitance. As shown in the equivalent circuit in the right side of FIG. 2c, the separately switchable series MOS transistors MSW may be represented as series combination of capacitors that are selectively shorted by the channel resistance Rch of each individual transistor when turned-on. Thus, by turning all transistors MSW off, a minimum series capacitance may be selected. By turning all transistors MSW on except for one, a maximum series capacitance may be selected.

Figure 2D:
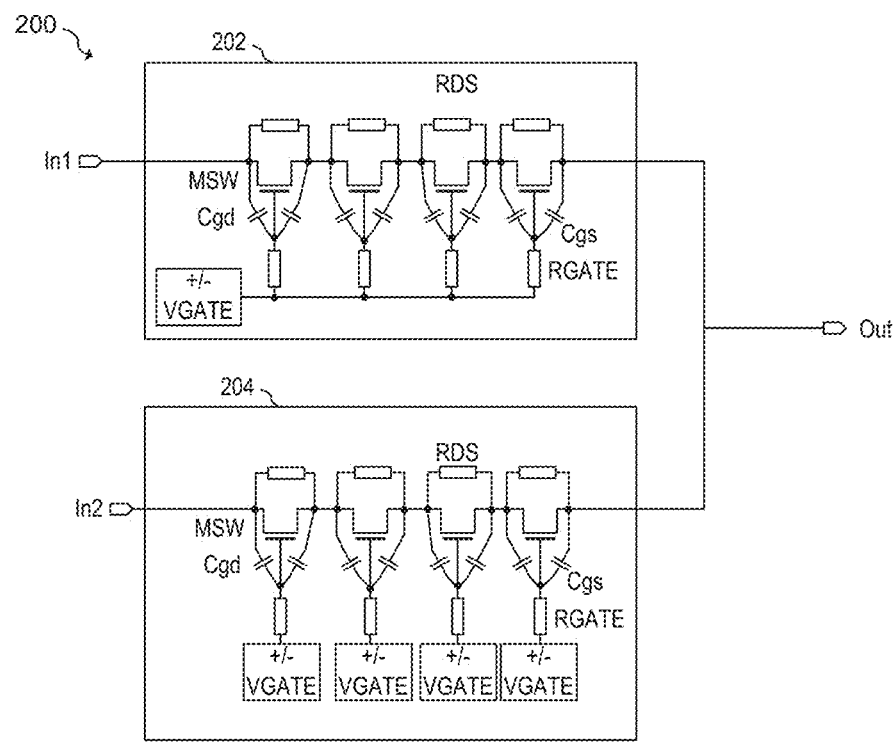

FIG. 2d illustrates a detail of an RF switching system 200 according to an embodiment of the present invention. As shown, first input port In1 is coupled to the output port Out via RF switch 202. As shown, the gates of series transistors MSW within RF switch 202 are all coupled to the same gate drive voltage the gate. Hence, RF switch 202 operates in either a high impedance mode (i.e., the switch is off) or a low impedance mode in which RF switch 202 provides a DC connection between first input port In1 and output port Out.

In some embodiments, programmable capacitances illustrated in FIGS. 2a-d may be implemented using circuits and methods described in U.S. patent application Ser. No. 14/243,338 filed on Apr. 2, 2014, which application is incorporated herein by reference in its entirety.

In an embodiment, circuit 204 coupled between second input port In2 and, and output port Out may be used either as an RF switch that can provide a DC path when the gates of all transistors MSW are activated, or may be used as an adjustable series capacitance. For use as an adjustable series capacitance, each individual gate of transistors MSW may be individually activated and/or deactivated. As long as at least one of the transistors MSW are turned off, a series capacitive path between second input port In2 an output port Out is established. As discussed above, the greater the number of transistors MSW that are shut off, the lower the series capacitance. On the other hand, a higher series capacitance may be implemented by activating all but one of transistors MSW. In some embodiments, in order to isolate first input port In1 from output port Out and/or isolate second input port In2 from output port Out, shunt switches (not shown) may be coupled to a first input port In1 and second input port In2 to prevent signals from propagating through the parasitic series capacitance, when the respective switch is desired to be off.

Embodiment switching circuits may also be implemented using a parallel programmable capacitor such as is illustrated with respect to embodiment switching RFIC 300 in FIG. 3. In an embodiment, switching RFIC 300 includes parallel programmable capacitor 354 coupled to RF switch 103 that selectively couples input node RF_IN to either output node RF1 or output node RF2. Settings for RF switch 103 and parallel programmable capacitor 354 may be selected using controller 106. In some embodiments, controller 106 is addressable via digital bus DIG.

Figure 3A:
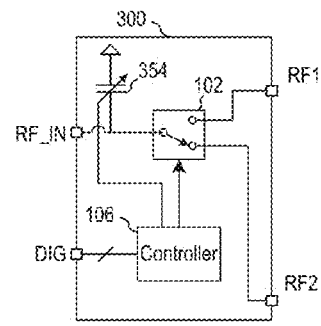
FIGS. 3a-b includes FIG. 3a that illustrates an embodiment RF switch using a programmable parallel capacitance, and FIG. 3b that illustrates an example programmable parallel capacitance.
Figure 3B:
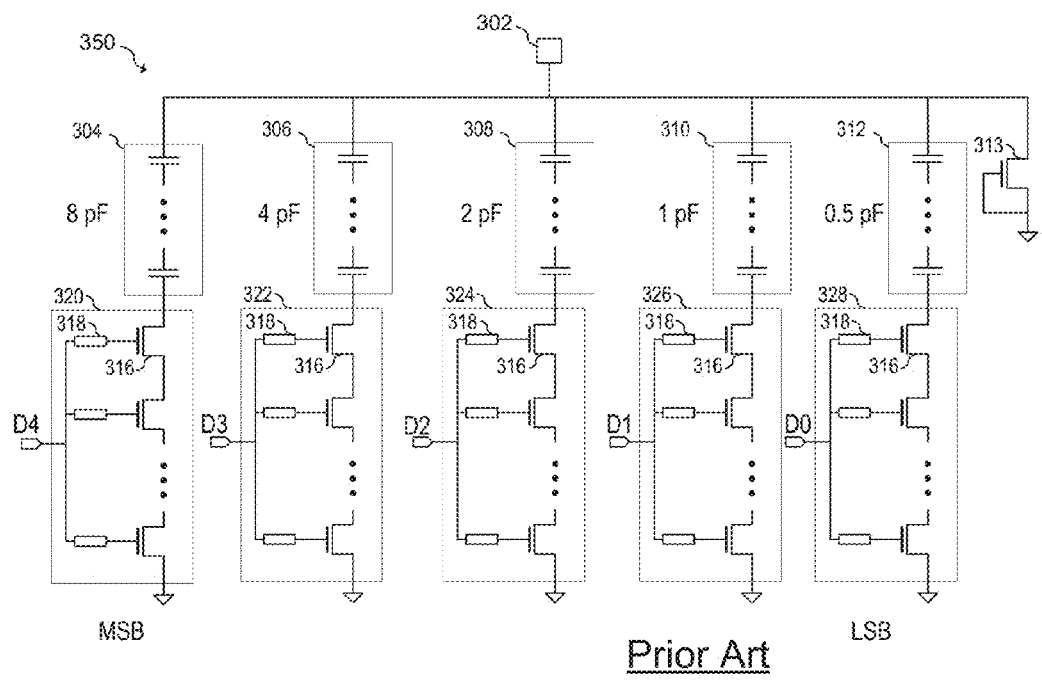

In some embodiments, the parallel programmable capacitor 354 may be implemented using a conventional programmable parallel capacitance circuit such as the digitally tunable capacitor circuit 350 illustrated in FIG. 3b. Digitally tunable capacitor circuit 350 includes binary weighted capacitances 304, 306, 308, 310 and 312, each of which is coupled to series switches 320, 322, 324, 326 and 328 respectively that are each implemented using series NMOS devices 316 and gate resistor 318. The values of capacitances 304, 306, 308, 310 and 312 are 8 pF, 4 pF, 2 pF, 1 pF and 0.5 pF, respectively. Each of capacitors 304, 306, 308, 310 and 312 are coupled to node 302, as well as to electrostatic discharge (ESD) protection transistor 313. The amount of capacitance seen at node 302 is controllable using digital signals D4, D3, D2, D1 and D0. For example, if signal D3 is at a logic high, thereby turning on series switch 322, and signals D4, D2, D1, and D0 or low, thereby turning off switches 320, 324, 326 and 328, then the capacitive load seen at node 302 is about 4 pF. Likewise, if all signals D3, D2, D1 and D0 are at logic high, then the load seen by node 302 is about 15.5 pF. In alternative embodiments, greater or fewer than five parallel switchable branches may be used. In addition, the various branch capacitances may be different values from those shown in FIG. 3.

In some embodiments, programmable capacitances described with respect to FIGS. 3a-b may be implemented using circuits and methods described in U.S. patent application Ser. No. 13/894,096 filed on May 14, 2013, and U.S. patent application Ser. No. 14/060,341 filed on Oct. 22, 2013, which applications are incorporated herein by reference in their entirety.

Figure 4:
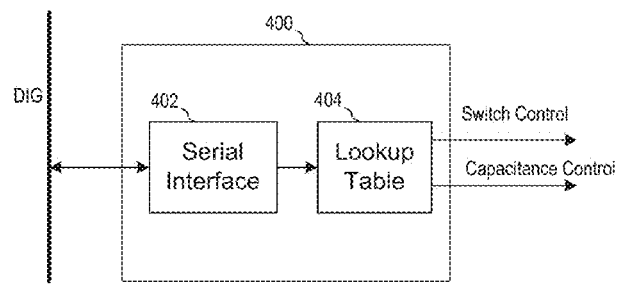
FIG. 4 illustrates an embodiment switch and capacitor controller.

FIG. 4 illustrates a block diagram of an embodiment controller that may be used, for example, to implement controller 106 shown in FIGS. 1 and 3a. Controller 400 includes a serial interface 402 coupled to digital bus DIG. Serial interface 402 may be implemented, for example, using an SPI interface, and I2C interface, MIPI/RFFE or other serial interface known in the art. In alternative embodiments of the present invention, serial interface 402 may also be implemented using a parallel interface. The output out serial interface 402 is coupled to the input of lookup table 404 that contains the requisite information to address the RF switch and the adjustable capacitor. In some embodiments, the contents of lookup table 404 may be programmable using non-volatile memory, fuses, mask-programmable memory, or other programming circuits and methods known in the art.

In an embodiment, lookup table 404 may be programmed to provide a capacitance control word that configures an adjustable capacitor to have a capacitance value that provides an impedance match between the input and the output of an embodiment RF switch. In some embodiments, these capacitance values may be programmed by a board or systems manufacturer during production of the RF system.

Figure 5A:
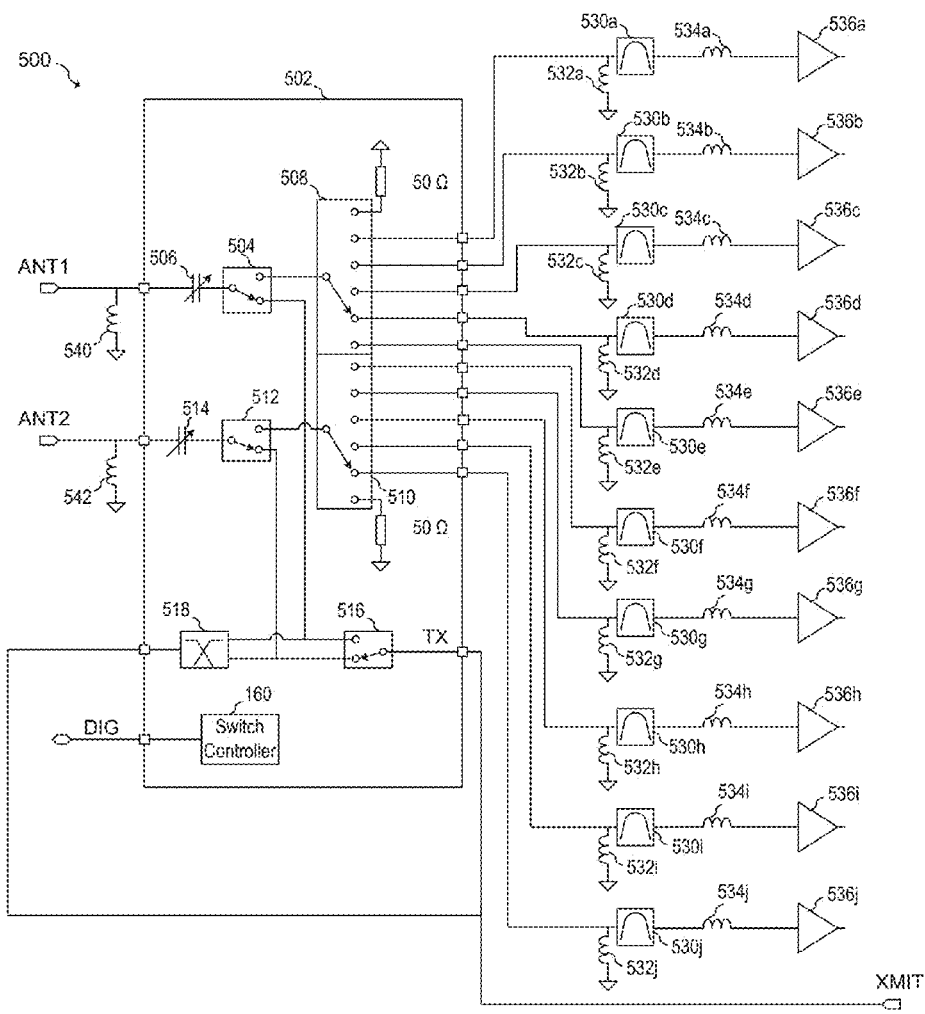
FIGS. 5a-c illustrate further embodiment RF switching systems and an associated Smith chart.

FIG. 5a illustrates RF system 500 according to a further embodiment of the present invention. As shown RFIC 502 includes a number of RF switches 504, 512, 508 and 510 that are be configured to couple input signal ANT1 to one of LNAs 536a-536e via super port switch 504, programmable capacitor 506, SP6T RF switch 508 and RF filters 530a-e, and to couple input signal ANT2 to one of LNAs 536f-536j via super port switch 512, programmable capacitor 514, SP6T RF switch 510 and RF filters 530f-j. LNAs 536a-j may be coupled, for example, to additional circuitry (not shown). Programmable capacitors 506 and 514 may be implemented according to the programmable capacitor embodiments described herein. Super port switches 504, 512 and 516 may be implemented using SPDT RF switches having a very low attenuation, for example, less than 0.1 dB or 0.2 dB. Each RF switch 504, 508, 510, 512 and 516 and programmable capacitor 506 and 514 is controlled via controller 160 that is connected to digital bus DIG.

RFIC 502 further includes super port switch 516, filter network 518 that may be used to route a transmit signal coupled to pin TX to one of signals ANT1 and ANT2. In some embodiments, filter network 518 may be a duplexer. For example, pin TX may be coupled to ANT1 via super port switches 516 and 504, and may be coupled to ANT2 via super port switches 516 and 512. Alternatively, a transmit signal may be routed to ANT1 via filter 518 and super port switch 504 and/or be routed to ANT2 via filter 518 and super port switch 512.

In an embodiment, programmable capacitor 506 is adjusted by controller 160 to provide an RF match between ANT1 and an RF output port or 50Ω termination selected by SP6T RF switch 508. Similarly, programmable capacitor 514 is adjusted by controller 160 to provide an RF match between ANT2 and an RF output port or 50Ω termination selected by SP6T RF switch 510. As shown, the output ports of RFIC 502 are loaded by one of RF filters 530a-j followed by LNAs 536a-j. In the illustrated example, shunt inductances 532a-j are coupled to the input of corresponding RF filters 530a-j, and series inductances 534a-j are coupled between corresponding RF filters 530a-j and LNAs 536a-j. Inputs ANT1 and ANT2 are loaded with shunt inductors 540 and 542, respectively.

It should be appreciated that RF system 500 and RFIC 502 is just one of many possible implementation examples of embodiment switch RFICs. In alternative embodiments, RFIC 502 may have different numbers of super port switches, SPMT switches and programmable capacitors. Moreover, in other embodiments, SP6T may be implemented using SPxT RF switches having greater or fewer output ports than six. It should be further appreciated that the configuration of the various filters, matching networks and amplifiers illustrated in Figure are just one of many examples. In alternative embodiments, RF system 500 may have a different configuration of RF components, such as, but not limited to greater or few RF filters, different matching network topologies, shared or multiplexed LNAs, and the like.

Figure 5B:
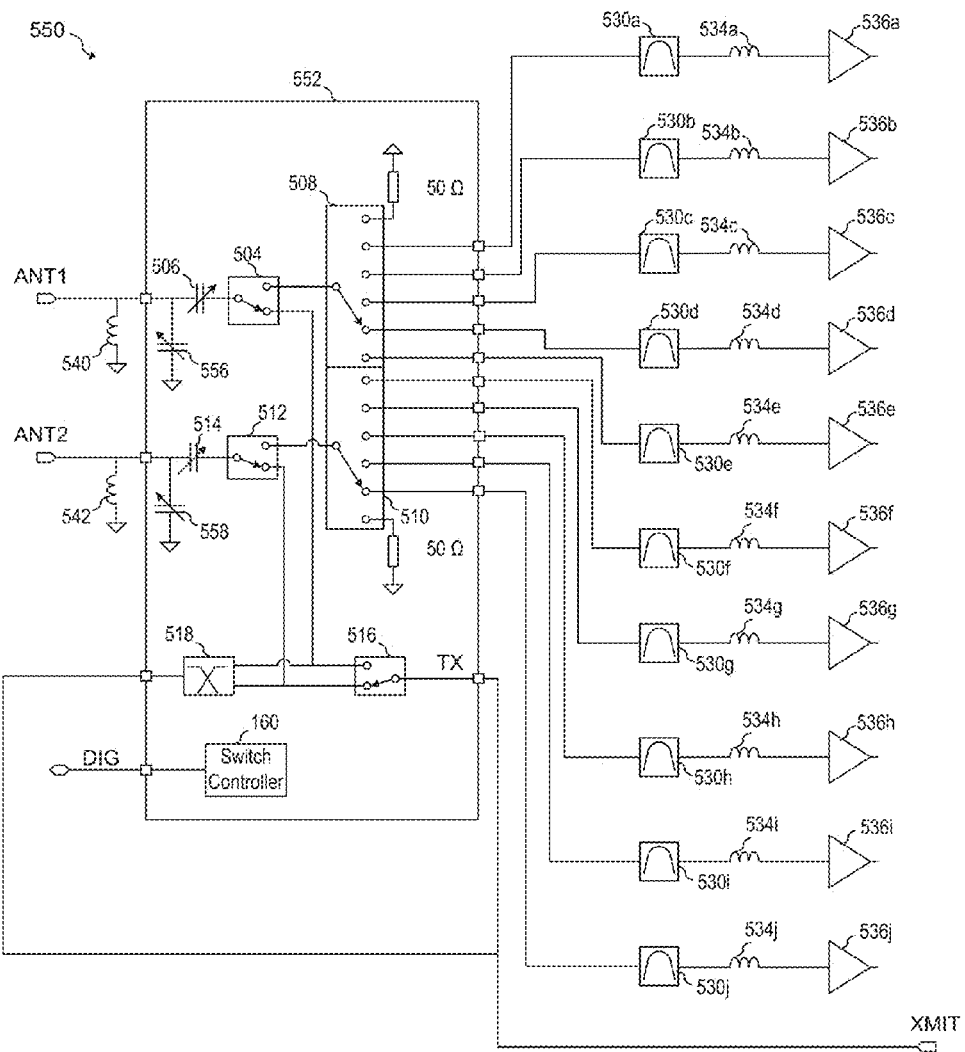

FIG. 5b illustrates RF system 550 according to a further embodiment of the present invention. RF system 550 includes RFIC 552, which is similar to RFIC 502 shown in FIG. 5a with the addition of shunt programmable capacitors 556 and 558. By using additional shunt programmable capacitors 556 and 558, shunt inductances 532a-j shown in RF system 500 of FIG. 5a may be eliminated, thereby conserving board area and reducing component count and system cost in some embodiments.

Figure 5C:
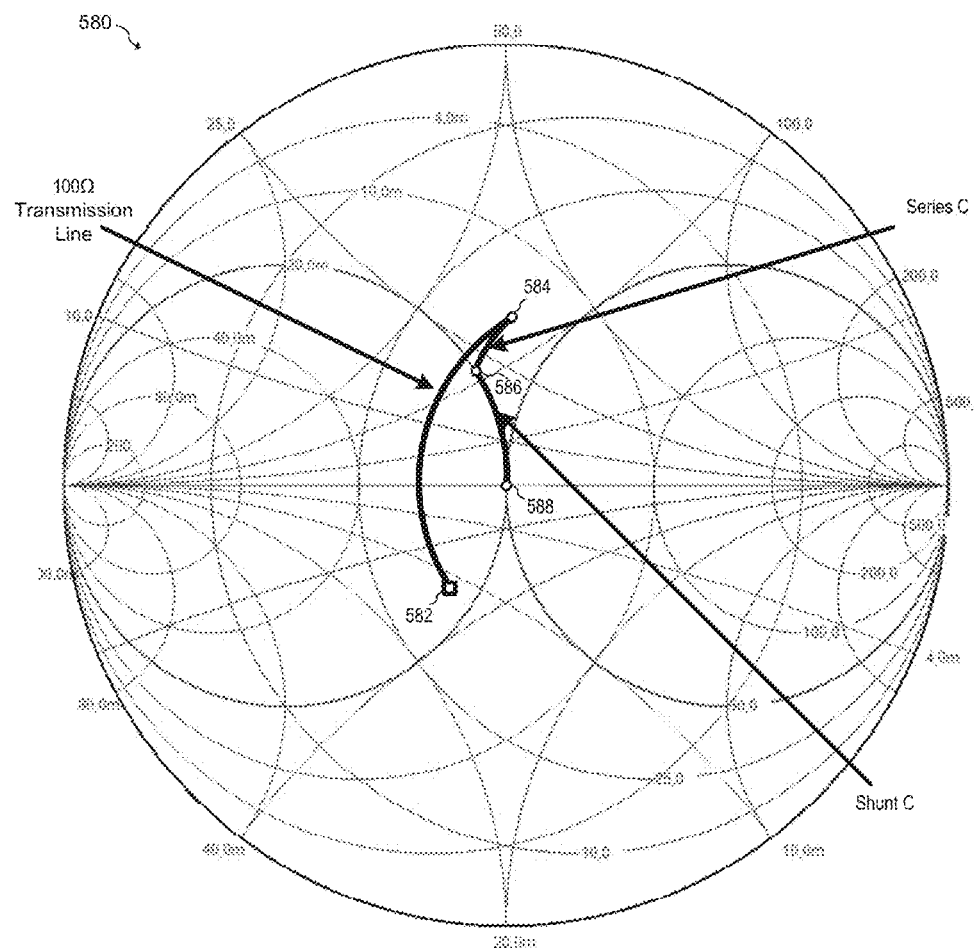

FIG. 5c shows Smith chart 580 that illustrates how matching is achieved with respect to RF system 550 of FIG. 5b. Point 582 on Smith chart 580 represents the input impedance of a SAW filter. As shown, the impedance at point 582 is transformed to point 584 using a length of 100Ω transmission line. In some embodiments, this length of transmission line is a few millimeters. Next, point 584 is transformed to point 586 using a series capacitance, such as series programmable capacitance 506 or 514 shown in FIG. 5b. Lastly, point 586 is transformed to a matched condition at point 588 at the center of Smith chart 580 using a shunt capacitance, such as shunt programmable capacitance 556 or 558 shown in FIG. 5b. It should be appreciated that Smith chart 580 is just one of many embodiment examples of how embodiment programmable capacitors may be used to provide matching in RF systems.

Figure 6:
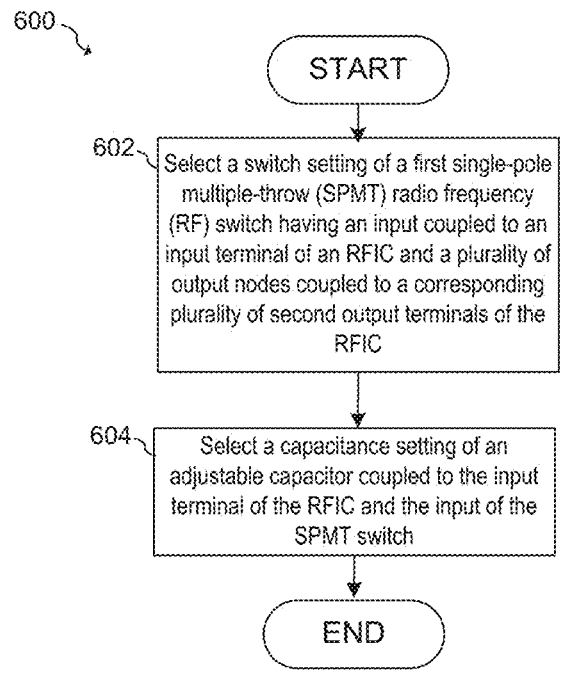
FIG. 6 illustrates a flowchart of an embodiment method.

FIG. 6 illustrates an embodiment method 600 of operating an RF system. In step 602, a switch setting is selected. In an embodiment, the switch setting pertains to a single-pole multiple-throw (SPMT) radio frequency (RF) switch having an input coupled an input terminal of an RFIC and a plurality of output nodes coupled to a corresponding plurality of second output terminals of the RFIC. In step 604, a capacitance setting is selected of an adjustable capacitor coupled to the input terminal of the RFIC and the input of the SPMT switch.

It should be understood that embodiment RF switch systems may be applied to a variety of applications. For example, SP4T RF-switch illustrated in FIGS. 1a-c may be implemented using embodiment RF switch driver circuits. Other applications that utilized RF switches may also be implemented using embodiment RF switch driver circuits as well.

Figure 7:
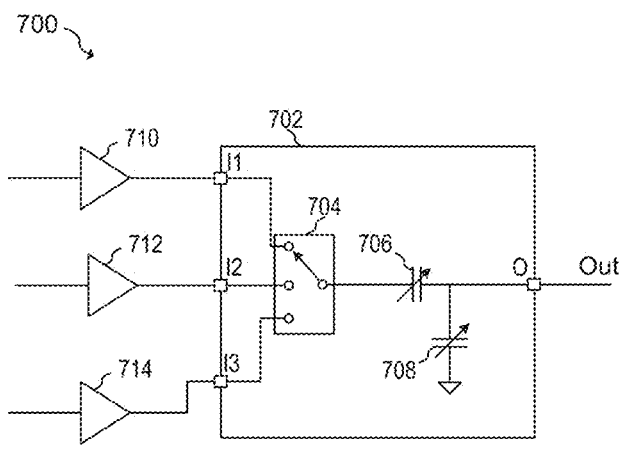
FIG. 7 illustrates another embodiment RF switching system.

FIG. 7 illustrates another embodiment RF switching system 700 in which the output of amplifiers 710, 712, and 714 are multiplexed to a single output node Out via RFIC 702 that includes RF switch 704, series programmable capacitor 706 and shunt programmable capacitor 708. In one embodiment, amplifiers 710, 712 and 714 are LNAs and node out may be coupled to a front-end of an RF circuit and the output of one of the LNAs may be selected using RF switch 704. Alternatively, the outputs of other types of amplifiers may be routed to other types of circuit. In some embodiments, series programmable capacitor 706 and shunt programmable capacitor 708 are used to provide matching, and may also be used to center the maximum gain within a frequency band. In further embodiments, RFIC 702 may have greater or fewer than three input ports as shown.

Figure 8:
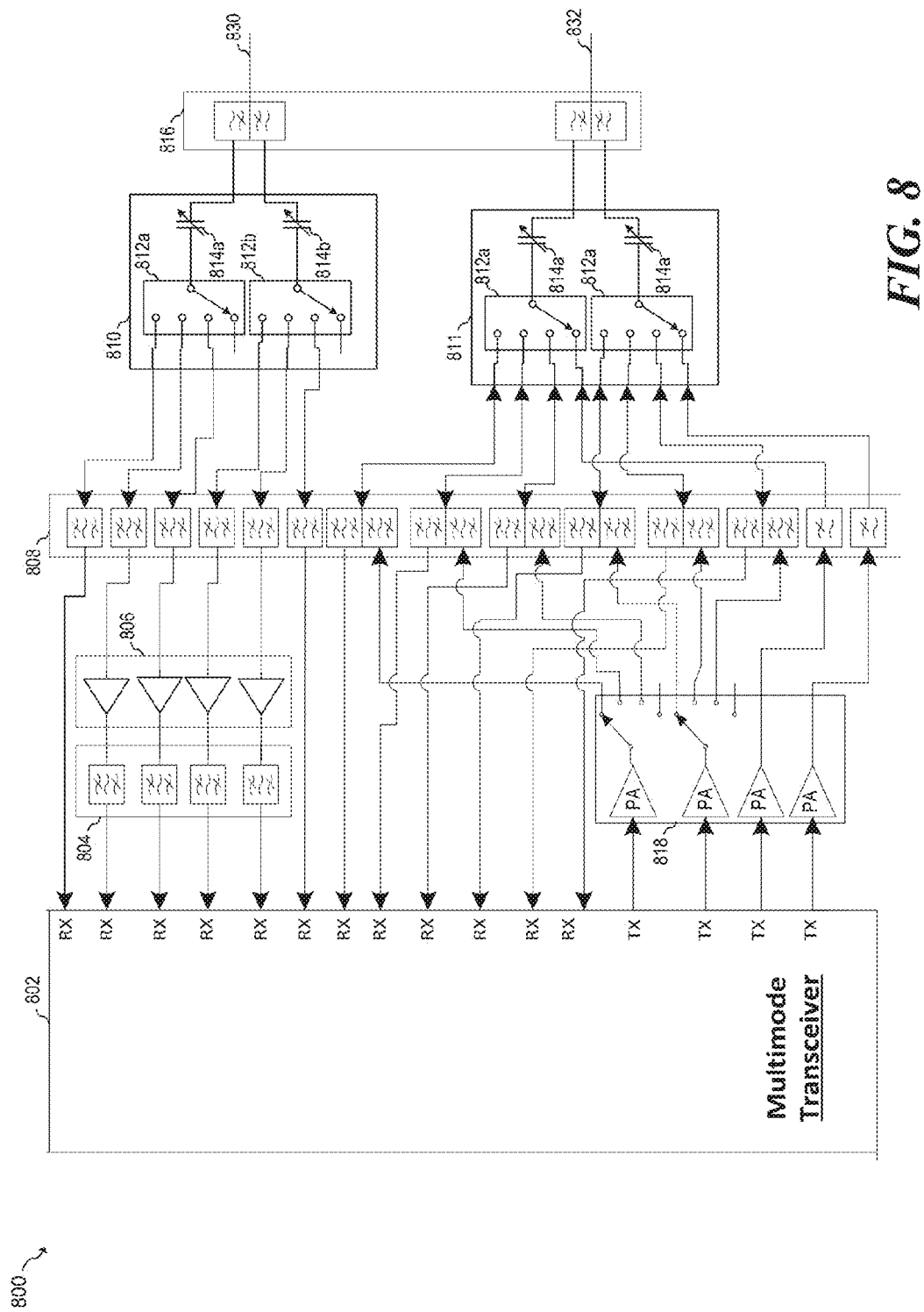
FIG. 8 illustrates a further embodiment RF system.

FIG. 8 illustrates RF system 800 according to an embodiment of the present invention that illustrates how transceiver 802 having multiple receive and transmit channels may be interfaced to system interface ports 830 and 832 via RF filters 816. As shown, components coupled to transceiver 802 may include RF filters 804 and 808, LNAs 806, tunable switching networks 810 and 811, and switchable power amplifiers (PAs) 818. In an embodiment, tunable switching networks 810 and 811 include SPMT switches 812a and 812b and adjustable capacitors 814a and 814, which may be adjusted to achieve a RF match with the inputs and output of filters 808 as described herein. As shown, switchable PA circuit 818 is coupled to the transmit outputs of transceiver 802. Tunable switching network 811 is configured to route various outputs of switchable PA circuit 818 and various receive inputs of transceiver 802 to interface port 832. Adjustable capacitors 814a and 814b of tunable switching network 811 may be used to match interface port 832 to the various components coupled to the ports of SPMT switches 812a and 812b tunable switching network 811.

In accordance with an embodiment, a radio frequency integrated circuit (RFIC) includes an adjustable capacitance coupled to an input terminal of the RFIC, and a first single-pole multiple-throw (SPMT) radio frequency (RF) switch having an input coupled to the adjustable capacitance and a plurality of output nodes coupled to a corresponding plurality of second output terminals of the RFIC. The adjustable capacitance may be implemented using a parallel adjustable capacitance, which may have plurality of switchable capacitances coupled in parallel. The RFIC further may further include a second SPMT RF switch coupled between the adjustable capacitance and the first SPMT RF switch. In one embodiment, a first output of the second SPMT RF switch is coupled to the input of the first SPMT RF switch. The RFIC may further include a third SPMT RF switch having an input coupled to a third input terminal of the RFIC, and a second output of the second SPMT RF switch is coupled to an output of the third SPMT RF switch. In some embodiments, the plurality of second output terminals of the RFIC are configured to be coupled to RF filters.

In an embodiment, the RFIC further includes a digital interface having an input coupled to a digital input terminal of the RFIC, a first output interface coupled to a control interface of the first SPMT RF switch, and a second output interface coupled to the adjustable capacitance. The adjustable capacitance may have a first node coupled to an input terminal of the RFIC and a second node coupled to the input of the RF switch. In some embodiments, the adjustable capacitance includes a plurality of switching transistors coupled in series. A capacitance of the adjustable capacitance may include gate-drain and gate-source capacitances of the plurality of switching transistors. In one example, at least one of the plurality of plurality of switching transistors is open during operation.

In an embodiment, the adjustable capacitance comprises a plurality of switchable capacitances coupled in series. The adjustable capacitance may include a first adjustable capacitance coupled in series between the input terminal and the first SPMT switch. In an embodiment, the adjustable capacitance further includes a second adjustable capacitance coupled in shunt between the first adjustable capacitance and a reference node.

In accordance with a further embodiment, a circuit includes a radio frequency integrated circuit (RFIC) having an adjustable capacitance having a first node coupled to an input terminal of the RFIC; a first single-pole multiple-throw (SPMT) radio frequency (RF) switch having an input coupled to a second node of the adjustable capacitance and a plurality of output nodes coupled to a corresponding plurality of second output terminals of the RFIC; and a controller coupled to a control interface of the adjustable capacitance and a control interface of the first SPMT switch. The circuit further includes a plurality of load circuits coupled to the corresponding plurality of second output terminals of the RFIC.

In an embodiment, the controller is configured to assign a control setting to the adjustable capacitance that corresponds to a selected setting of the first SPMT switch. The controller may be configured to assign a setting to the adjustable capacitance that provides an RF match to one of the plurality of load circuits that corresponds to a selected setting of the first SPMT. In an embodiment, the plurality of load circuits includes a plurality of RF filters, at least one low noise amplifier (LNA) coupled to an output of one of the plurality of RF filters, and/or a digital interface coupled to an input of the RFIC. The circuit may also include an RF power amplifier (PA) having an output coupled to one of the second output terminals of the RFIC.

In an embodiment, the RFIC and the plurality of load circuits are disposed on a circuit board. This circuit board may include a first conductive trace coupled between a first of the plurality of second output terminals of the RFIC and a first of the plurality of load circuits, and a second conductive trace coupled between a first of the plurality of second output terminals of the RFIC and a first of the plurality of load circuits. A length of the first conductive trace is different from a length of the second conductive trace.

In accordance with a further embodiment, a method of operating a radio frequency (RF) system includes selecting a switch setting of a first single-pole multiple-throw (SPMT) radio frequency (RF) switch having an input coupled an input terminal of an RFIC and a plurality of output nodes coupled to a corresponding plurality of second output terminals of the RFIC. The method further includes selecting a capacitance setting of an adjustable capacitor coupled to the input terminal of the RFIC and the input of the SPMT switch. The adjustable capacitor may include an adjustable series capacitor coupled between the input terminal of the RFIC and the input of the SPMT switch.

In an embodiment, the method further comprising determining the selected capacitance setting. The selected capacitance setting is determined to provide an RF match between the input terminal of the RFIC and the second output terminal corresponding to the selected switch setting. The method may further include receiving an RF signal at the input terminal of the RFIC, and conveying the received RF signal to a filter coupled to the second output terminal corresponding to the selected switch setting. The method may also include amplifying an output of the filter.

Advantages of embodiments of the present invention include the ability to couple multiple RF loads to outputs of a SPMT switch without using additional series capacitors to provide matching to the individual loads, because the adjustable series capacitor provides the requisite series capacitance. As such, board space may be conserved and coupling and crosstalk may be reduced.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, embodiment switch drivers could be used to tune oscillators by switching in and out capacitors and other tuning components. Embodiment switch driver circuits may also be applied to receive/transmit switches, attenuators, power amplifier bypass circuits, RF matching, RF filter switching in general, as well as other types of circuits and systems.

What is claimed is:

1. A radio frequency integrated circuit (RFIC) comprising:
    an adjustable capacitance coupled to an input terminal of the RFIC;
    a first single-pole multiple-throw (SPMT) radio frequency (RF) switch having an input coupled to the adjustable capacitance and a plurality of output nodes coupled to a corresponding plurality of second output terminals of the RFIC; and
    a digital interface having an input coupled to a digital input terminal of the RFIC, a first output interface coupled to a control interface of the first SPMT RF switch, and a second output interface coupled to the adjustable capacitance.

2. The RFIC of claim 1, wherein the adjustable capacitance comprises a parallel adjustable capacitance.

3. The RFIC of claim 2, wherein the parallel adjustable capacitance comprises a plurality of switchable capacitances coupled in parallel.

4. The RFIC of claim 1, wherein the plurality of second output terminals of the RFIC are configured to be coupled to RF filters.

5. The RFIC of claim 1, wherein the adjustable capacitance has a first node coupled to an input terminal of the RFIC and a second node coupled to the input of the RF switch.

6. The RFIC of claim 1, wherein the adjustable capacitance comprises a first adjustable capacitance coupled in series between the input terminal and the first SPMT switch.

7. The RFIC of claim 6, wherein the adjustable capacitance further comprises a second adjustable capacitance coupled in shunt between the first adjustable capacitance and a reference node.

8. A radio frequency integrated circuit (RFIC) comprising:
    an adjustable capacitance coupled to an input terminal of the RFIC; and
    a first single-pole multiple-throw (SPMT) radio frequency (RF) switch having an input coupled to the adjustable capacitance and a plurality of output nodes coupled to a corresponding plurality of second output terminals of the RFIC, wherein the RFIC further comprises a second SPMT RF switch coupled between the adjustable capacitance and the first SPMT RF switch.

9. The RFIC of claim 8, wherein a first output of the second SPMT RF switch is coupled to the input of the first SPMT RF switch.

10. The RFIC of claim 8, wherein the RFIC further comprises a third SPMT RF switch having an input coupled to a third input terminal of the RFIC, and a second output of the second SPMT RF switch is coupled to an output of the third SPMT RF switch.

11. A radio frequency integrated circuit (RFIC) comprising:
    an adjustable capacitance coupled to an input terminal of the RFIC; and
    a first single-pole multiple-throw (SPMT) radio frequency (RF) switch having an input coupled to the adjustable capacitance and a plurality of output nodes coupled to a corresponding plurality of second output terminals of the RFIC, wherein
    the adjustable capacitance has a first node coupled to an input terminal of the RFIC and a second node coupled to the input of the RF switch, and
    the adjustable capacitance comprises a plurality of switching transistors coupled in series.

12. The RFIC of claim 11, wherein a capacitance of the adjustable capacitance comprises gate-drain and gate-source capacitances of the plurality of switching transistors.

13. The RFIC of claim 12, wherein at least one of the plurality of plurality of switching transistors is open during operation.

14. A radio frequency integrated circuit (RFIC) comprising:
    an adjustable capacitance coupled to an input terminal of the RFIC; and
    a first single-pole multiple-throw (SPMT) radio frequency (RF) switch having an input coupled to the adjustable capacitance and a plurality of output nodes coupled to a corresponding plurality of second output terminals of the RFIC, wherein the adjustable capacitance comprises a plurality of switchable capacitances coupled in series.

15. A circuit comprising:
a radio frequency integrated circuit (RFIC) comprising:
an adjustable capacitance having a first node coupled to an input terminal of the RFIC,
a first single-pole multiple-throw (SPMT) radio frequency (RF) switch having an input coupled to a second node of the adjustable capacitance and a plurality of output nodes coupled to a corresponding plurality of second output terminals of the RFIC, and
a controller coupled to a control interface of the adjustable capacitance and a control interface of the first SPMT switch; and
a plurality of load circuits coupled to the corresponding plurality of second output terminals of the RFIC, wherein the controller is configured to assign a control setting to the adjustable capacitance that corresponds to a selected setting of the first SPMT switch.

16. The circuit of claim 15, wherein the controller is configured to assign a setting to the adjustable capacitance that provides an RF match to one of the plurality of load circuits that corresponds to a selected setting of the first SPMT.

17. The circuit of claim 15, wherein the plurality of load circuits comprises a plurality of RF filters.

18. The circuit of claim 17, further comprising at least one low noise amplifier (LNA) coupled to an output of one of the plurality of RF filters.

19. The circuit of claim 15, wherein:
the RFIC and the plurality of load circuits are disposed on a circuit board; and
the circuit board comprises
a first conductive trace coupled between a first of the plurality of second output terminals of the RFIC and a first of the plurality of load circuits, and
a second conductive trace coupled between a first of the plurality of second output terminals of the RFIC and a first of the plurality of load circuits, wherein a length if the first conductive trace is different from a length of the second conductive trace.

20. The circuit of claim 15, further comprising an RF power amplifier (PA) having an output coupled to one of the second output terminals of the RFIC.

21. A circuit comprising:
a radio frequency integrated circuit (RFIC) comprising:
an adjustable capacitance having a first node coupled to an input terminal of the RFIC
a first single-pole multiple-throw (SPMT) radio frequency (RF) switch having an input coupled to a second node of the adjustable capacitance and a plurality of output nodes coupled to a corresponding plurality of second output terminals of the RFIC, and
a controller coupled to a control interface of the adjustable capacitance and a control interface of the first SPMT switch; and
a plurality of load circuits coupled to the corresponding plurality of second output terminals of the RFIC, wherein the controller comprises a digital interface coupled to an input of the RFIC.

22. A method of operating a radio frequency (RF) system, the method comprising:
selecting a switch setting of a first single-pole multiple-throw (SPMT) radio frequency (RF) switch having an input coupled an input terminal of an RFIC and a plurality of output nodes coupled to a corresponding plurality of second output terminals of the RFIC; and
selecting a capacitance setting of an adjustable capacitor coupled to the input terminal of the RFIC and the input of the SPMT switch, wherein the selected capacitance setting corresponds to the selected switch setting of the first SPMT RF switch.

23. The method of claim 22, further comprising determining the selected capacitance setting, wherein the selected capacitance setting is determined to provide an RF match between the input terminal of the RFIC and the second output terminal corresponding to the selected switch setting.

24. The method of claim 22, further comprising:
receiving an RF signal at the input terminal of the RFIC; and
conveying the received RF signal to a filter coupled to the second output terminal corresponding to the selected switch setting.

25. The method of claim 24, further comprising amplifying an output of the filter.

26. The method of claim 22, wherein the adjustable capacitor comprises an adjustable series capacitor coupled between the input terminal of the RFIC and the input of the SPMT switch.

\* \* \* \* \*